United States Patent
Nam (10) Patent No.: US 10,377,329 B2
(45) Date of Patent: Aug. 13, 2019

(54) VEHICLE AND METHOD FOR REMOTELY CONTROLLING THE SAME

(71) Applicants: Hyundai Motor Company, Seoul (KR); Kia Motors Corporation, Seoul (KR)

(72) Inventor: Min Hwan Nam, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/831,665

(22) Filed: Dec. 5, 2017

(65) Prior Publication Data

US 2018/0236957 A1 Aug. 23, 2018

(30) Foreign Application Priority Data

Feb. 20, 2017 (KR) ........................ 10-2017-0022382

(51) Int. Cl.
*B60R 21/00* (2006.01)
*G05D 1/00* (2006.01)
*B60W 30/09* (2012.01)
*G08G 1/16* (2006.01)
*B60W 30/06* (2006.01)
(Continued)

(52) U.S. Cl.
CPC ............. *B60R 21/00* (2013.01); *B60W 30/06* (2013.01); *B60W 30/09* (2013.01); *B60W 30/0953* (2013.01); *B62D 15/027* (2013.01); *B62D 15/0285* (2013.01); *G05D 1/0011* (2013.01); *G08G 1/168* (2013.01); *B60W 2050/143* (2013.01); *B60W 2422/95* (2013.01); *B60W 2540/00* (2013.01); *B60W 2550/40* (2013.01);
(Continued)

(58) Field of Classification Search
USPC ........................................................... 701/2
See application file for complete search history.

(56) References Cited

U.S. PATENT DOCUMENTS 6,496,100 B1 * 12/2002 Hiebl ..................... B60R 25/24
307/10.3
2004/0051379 A1 * 3/2004 Turner .................. B60R 25/045
307/10.2
(Continued)

FOREIGN PATENT DOCUMENTS

DE 102013207369 A1 10/2014
DE 102014200141 A1 7/2015
(Continued)

OTHER PUBLICATIONS

Extended European Search Report for European Patent Application No. 17205112, dated Jun. 25, 2018, 8 pages.

*Primary Examiner* — Tyler D Paige
(74) *Attorney, Agent, or Firm* — Mintz Levin Cohn Ferris Glovsky and Popeo, P.C.; Peter F. Corless (57) ABSTRACT

A vehicle includes: a communication unit performing communication with a remote control device and receiving an instruction signal for remotely controlling a driving operation of the vehicle from the remote control device; a position acquiring unit detecting a position of the remote control device when the communication unit receives the instruction signal from the remote control device; and a controller restricting the remote control of the driving operation of the vehicle based on the detected position of the remote control device.

20 Claims, 9 Drawing Sheets

(51) Int. Cl.
*B62D 15/02* (2006.01)
*B60W 30/095* (2012.01)
*B60W 50/14* (2012.01)

(52) U.S. Cl.
CPC ... *B60W 2550/404* (2013.01); *B60W 2750/40* (2013.01); *G05D 2201/0213* (2013.01)

(56) References Cited

U.S. PATENT DOCUMENTS

| | | | |
|---|---|---|---|
| 2014/0188348 A1* | 7/2014 | Gautama | B60W 10/30 701/48 |
| 2015/0193729 A1* | 7/2015 | Van Wiemeersch | G06Q 10/087 701/2 |
| 2017/0352211 A1* | 12/2017 | Asmar | B60R 25/04 |
| 2018/0236957 A1* | 8/2018 | Nam | B60W 30/06 |

FOREIGN PATENT DOCUMENTS

| | | |
|---|---|---|
| JP | 2001-001929 A | 1/2001 |
| JP | 2015-081022 A | 4/2015 |
| KR | 2016-0015987 A | 2/2016 |
| KR | 2016-0061654 A | 6/2016 |
| KR | 10-1641267 B1 | 7/2016 |
| WO | 2008/046703 A1 | 4/2008 |

* cited by examiner

FIG. 7B
Changing Vehicle Trajectory When Braking System Is Failed

VEHICLE AND METHOD FOR REMOTELY CONTROLLING THE SAME

CROSS-REFERENCE TO RELATED APPLICATION

This application claims the benefit of priority to Korean Patent Application No. 10-2017-0022382, filed on Feb. 20, 2017 in the Korean Intellectual Property Office, the disclosure of which is hereby incorporated by reference as if fully set forth herein.

TECHNICAL FIELD

The disclosure relates generally to a vehicle and a method for controlling the vehicle, and more particularly, to a vehicle and a control method thereof in order to perform remote control of the vehicle.

BACKGROUND

A remote control device, such as a smart key, a key fob, or the like, has functions for remotely controlling a driving operation (e.g., parking, driving, etc.) of a controllable vehicle. A driver near the vehicle can manipulate the remote control device to remotely park the vehicle at a desired parking area or remotely drive the vehicle out to a desired location.

However, if a specific button for remote control is pressed by someone other than the owner of the vehicle, the remote parking or other remote control function can be performed unintentionally. Further, when the remote control function is unintentionally performed, the possibility for accidents or injury occurring as a result of the vehicle can drastically increase. As another example, the remote parking or control operation could be performed even when a control button of the remote control device is unintentionally pressed in driver's pocket, backpack, purse, or the like.

SUMMARY

The present disclosure can provide a method for remotely controlling a vehicle using a remote control device. The control method may include obtaining or acquiring a position of the remote control device before remotely controlling a driving operation, such as parking, driving, etc., of a vehicle, in order to restrict the remote control of the driving operation of the vehicle, based at least on the position of the remote control device.

According to embodiments of the present disclosure, a vehicle includes: a communication unit performing communication with a remote control device and receiving an instruction signal for remotely controlling a driving operation of the vehicle from the remote control device; a position acquiring unit detecting a position of the remote control device when the communication unit receives the instruction signal from the remote control device; and a controller restricting the remote control of the driving operation of the vehicle based on the detected position of the remote control device.

The controller can generate and send a notification to the remote control device informing that the remote control of the driving operation of the vehicle is restricted.

The controller can determine whether the remote control device is located in the vehicle based on the detected position of the remote control device, and restrict the remote control of the driving operation of the vehicle when the remote control device is determined to be located in the vehicle.

The controller can determine whether the remote control device is located within a predetermined distance of the vehicle based on the detected position of the remote control device, and restrict the remote control of the driving operation of the vehicle when the remote control device is determined to be located within the predetermined distance from the vehicle.

The controller can estimate a moving path for the driving operation of the vehicle, the moving path including at least one of a straight line and a curve in a forward or backward direction.

The controller can determine whether the remote control device is located along the estimated moving path based on the detected position of the remote control device, and restrict the driving operation of the vehicle when the remote control device is determined to be located along the moving path.

The controller can generate and send a collision warning, alert, or notification to the remote control device when the remote control device is determined to be located along the moving path.

The controller can change the moving path when the remote control device is determined to be located along the moving path so that the moving path deviates from the remote control device.

The communication unit can include at least three receivers, each receiver detecting the instruction signal from the remote control device, the at least three receiver being mounted at different positions in the vehicle.

The position acquiring unit can calculate candidate locations of the remote control device based on signal powers of received instruction signals, each of the instruction signals being detected by each of the at least three receivers, and determine an intersecting point of the candidate locations to be the position of the remote control device.

The controller can monitor a braking system of the vehicle, and adjusts a moving path of the vehicle according to the remote control of the driving operation of the vehicle when the controller detects a predetermined error in the braking system.

Furthermore, according to embodiments of the present disclosure, a method for controlling a vehicle includes: receiving, by a communication unit, an instruction signal for remotely controlling a driving operation of the vehicle from a remote control device; detecting, by a position acquiring unit, a position of the remote control device when the communication unit receives the instruction signal from the remote control device; and restricting, by a controller, the remote control of the driving operation of the vehicle based on the detected position of the remote control device.

The method can further include generating and sending, by the controller, a notification to the remote control device informing that the remote control of the driving operation of the vehicle is restricted.

The restricting of the remote control can include determining, by the controller, whether the remote control device is located in the vehicle based on the detected position of the remote control device; and restrict, by the controller, the remote control of the driving operation of the vehicle when the remote control device is determined to be located in the vehicle.

The restricting of the remote control can include determining, by the controller, whether the remote control device is located within a predetermined distance of the vehicle based on the detected position of the remote control device; and restricting, by the controller, the remote control of the driving operation of the vehicle when the remote control device is determined to be located within the predetermined distance from the vehicle.

The method can further include estimating, by the controller, a moving path for the driving operation of the vehicle, the moving path including at least one of a straight line and a curve in a forward or backward direction.

The restricting of the remote control can include determining, by the controller, whether the remote control device is located along the estimated moving path based on the detected position of the remote control device; and restricting, by the controller, the driving operation of the vehicle when the remote control device is determined to be located along the moving path.

The method can further include generating and sending, by the controller, a collision warning, alert, or notification to the remote control device when the remote control device is determined to be located along the moving path.

The method can further include changing, by the controller, the moving path when the remote control device is determined to be located along the moving path so that the moving path deviates from the remote control device.

Furthermore, according to embodiments of the present disclosure, an apparatus for controlling a vehicle, equipped within the vehicle, can include a processing system having at least one data processor and at least one computer-readable memory storing a computer program. Herein, the processing system is configured to cause the apparatus to: receive an instruction signal for remotely controlling a driving operation of the vehicle from a remote control device; detect a position of the remote control device in response to receiving the instruction signal from the vehicle; and restrict the remote control of the driving operation of the vehicle based on the detected position of the remote control device.

Advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 2a to 7b show a process of restricting a remote control of a driving operation of the vehicle based at least on a position of remote control device according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Reference will now be made in detail to the certain embodiments of the disclosure, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e., open transition). The term "coupled" or "operatively coupled" as used herein, is defined as connected, although not necessarily directly, and not necessarily mechanically.

In the description of the disclosure, certain detailed explanations of related art are omitted when it is deemed that they may unnecessarily obscure the essence of the disclosure. The features of the disclosure will be more clearly understood from the accompanying drawings and should not be limited by the accompanying drawings. It is to be appreciated that all changes, equivalents, and substitutes that do not depart from the spirit and technical scope of the disclosure are encompassed in the disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, referring to FIGS. 1 to 7b, a method and an apparatus for restricting or limiting a remote control of a driving operation of the vehicle based at least on a position of a remote control device according to embodiments of the disclosure will be described in detail.

Figure 1:
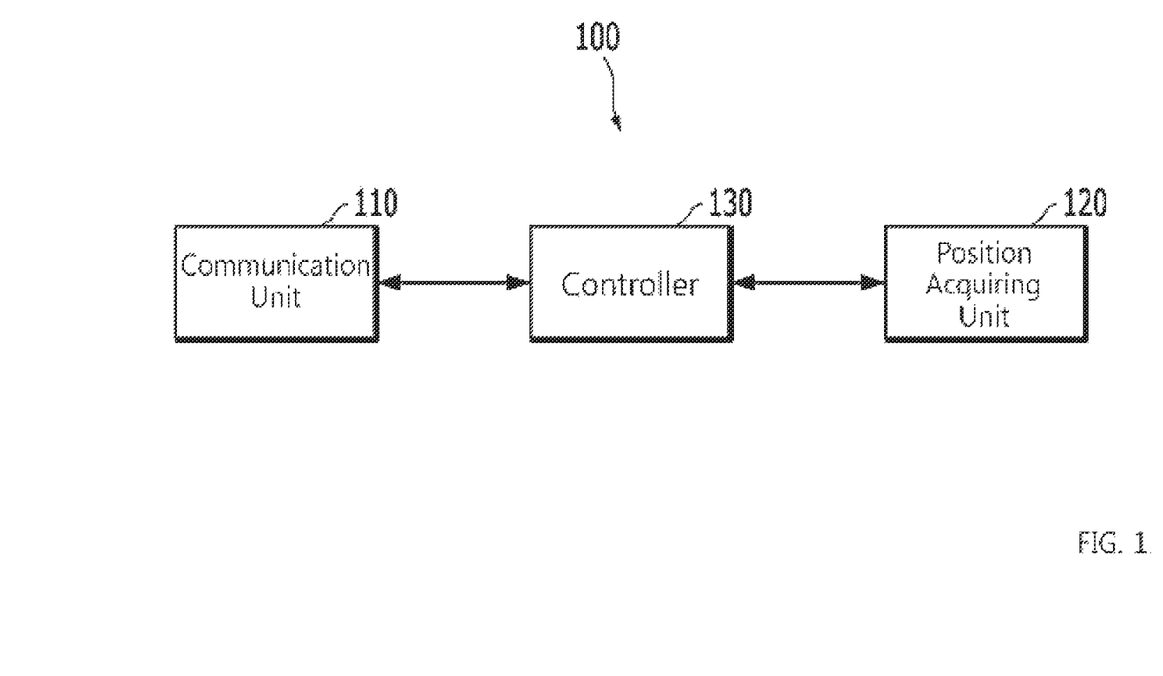
FIG. 1 is a block diagram showing an example of a vehicle according to embodiments of the present disclosure.

FIG. 1 is a block diagram showing an example of a vehicle according to embodiments of the disclosure.

FIGS. 2a to 7b show a process of restricting a remote control of a driving operation of the vehicle based at least on a position of remote control device according to embodiments of the disclosure.

Referring to FIGS. 1 to 7b, a vehicle 100 according to embodiments of the disclosure can include a communication unit 110 configured to perform communication with a remote control device 200. The communication unit 110 can transmit to, and receive from, the remote control device 200 signals related to various operations of the vehicle 100. The vehicle 100 can include a position acquiring unit 120 configured to recognize a position of the remote control device 200 when the communication unit 100 receives an instruction signal for remotely controlling a driving operation of the vehicle 100 from the remote control device 200, and a controller 130 configured to restrict an operation for remotely parking or taking-out the vehicle 100 based at least on the position of the remote control device 200.

That is, when the communication unit 110 receives the instruction signal for remotely controlling a driving operation of the vehicle 100 from the remote control device 200, the position acquiring unit 120 can obtain a position of the remote control device 200. In response to the position of the remote control device 200, the controller 130 can restrict or limit the ability to the remote control device 200 to control a driving operation of the vehicle 100 remotely. For the purposes of the present disclosure, a "driving operation" of the vehicle 100, which is subject to remote control from the remote control device 200, may refer to, for example, parking the vehicle 100, pulling the vehicle 100 out of a parking spot, or otherwise driving the vehicle 100.

At this time, the controller 130 may perform an operation for informing or notifying a user having the remote control apparatus 200 that the operation for remotely parking or taking out the vehicle 100 is restricted.

According to embodiments of the present disclosure, the controller 130 can output a sound indicating that the remote parking or taking-out is restricted through a speaker mounted on the vehicle 100. Or, to notify that the operation for remotely controlling a driving operation of the vehicle 100 is restricted, the controller 130 can generate a horn (e.g., the Klaxon horn) of the vehicle 100 a predetermined number of times during a predetermined period. The controller 130 can turn on an emergency light of the vehicle 100 for a predetermined time to inform that the remote parking or taking-out is restricted. Further, a headlight of the vehicle 100 may be turned on by the controller 130 for a predetermined time to inform that the operation for remotely controlling a driving operation of the vehicle 100 is restricted. It is possible to notify that remote parking or taking-out is restricted by turning on a high beam of the headlight of the vehicle 100 a predetermined number of times for a predetermined time.

In embodiments of the present disclosure, the controller 130 could include a computing device such as a processing system that comprises at least one data processor and at least one computer-readable memory storing a computer program.

Embodiments of the present disclosure allow for ensuring safety when the vehicle 100 is remotely parked or otherwise driven in response to an instruction signal delivered from the remote control device 200. Broadly, the controller 130 configured to control overall operations of the vehicle 100 can perform three restricted operations as follows.

First, the controller 130 may recognize the position of the remote control device 200 that can support the remote control of a driving operation of the vehicle 100.

Second, the controller 130 may determine whether the remote control device 200 is placed on an estimated path or route before the vehicle 100 is remotely parked or taken out, and prohibit the remote control when the remote control device 200 is located on the estimated path or route.

Third, the controller 130 can change the estimated path or route when the remote control device 200 is placed on the estimated path or route while the vehicle 100 is remotely parked or taken out.

Hereinafter, with reference to FIGS. 2a to 7b, the above-mentioned three restricted operations when the vehicle is remotely parked or taken out will be described in detail.

First, with reference to FIGS. 2a, 2b and 3, a process for recognizing the position of the remote control device 200 supporting the remote parking or taking-out of the vehicle 100 will be described in detail.

Figure 2A:
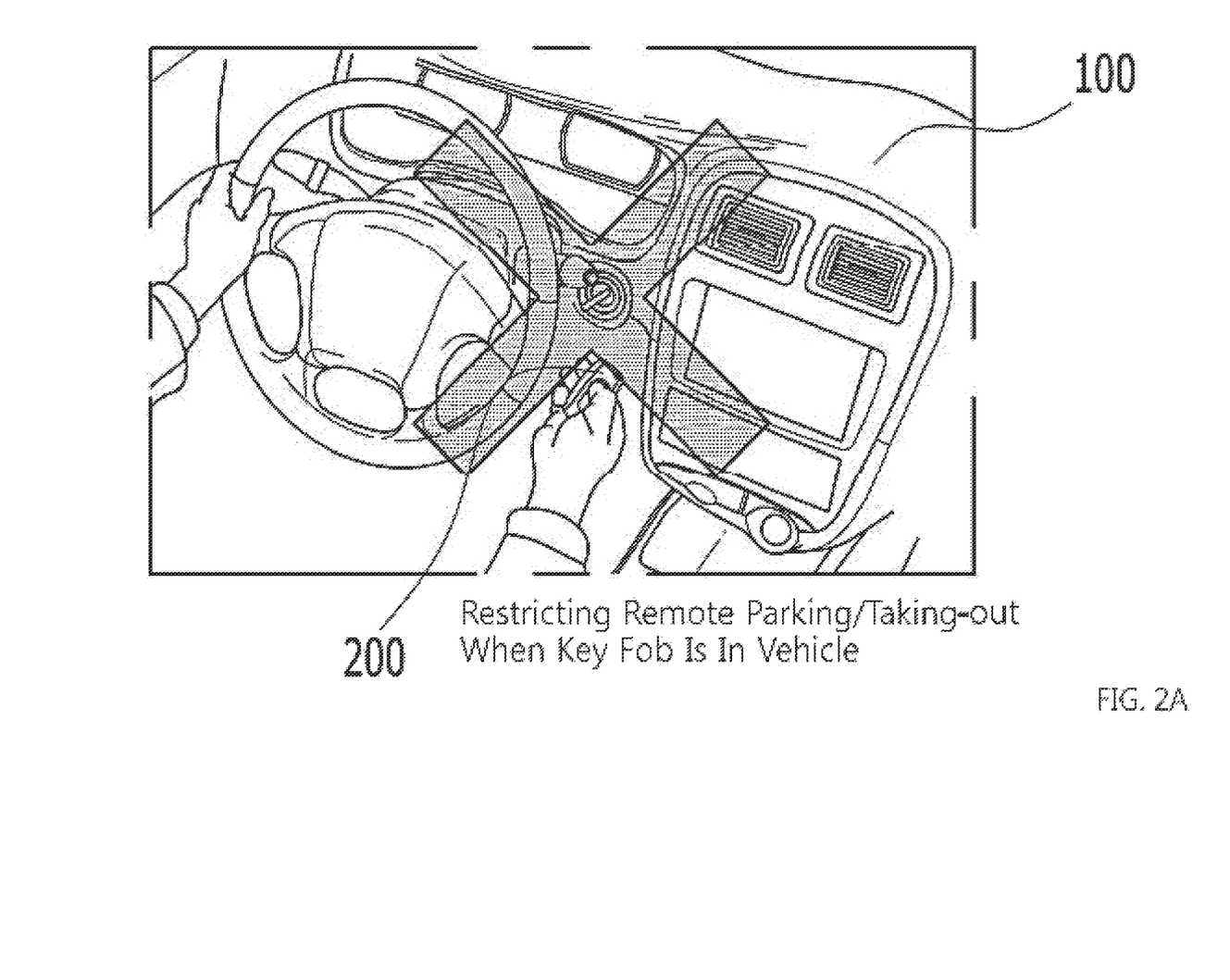
Figure 2B:
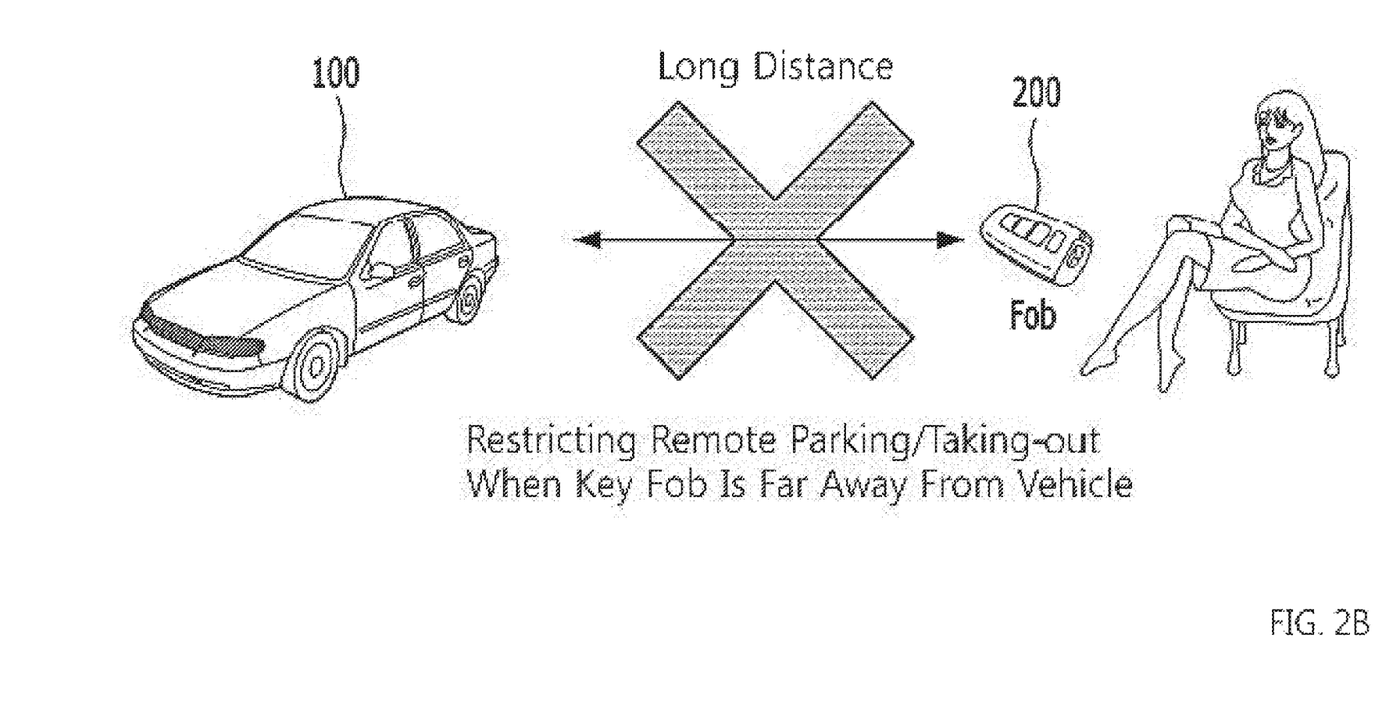
Figure 3:
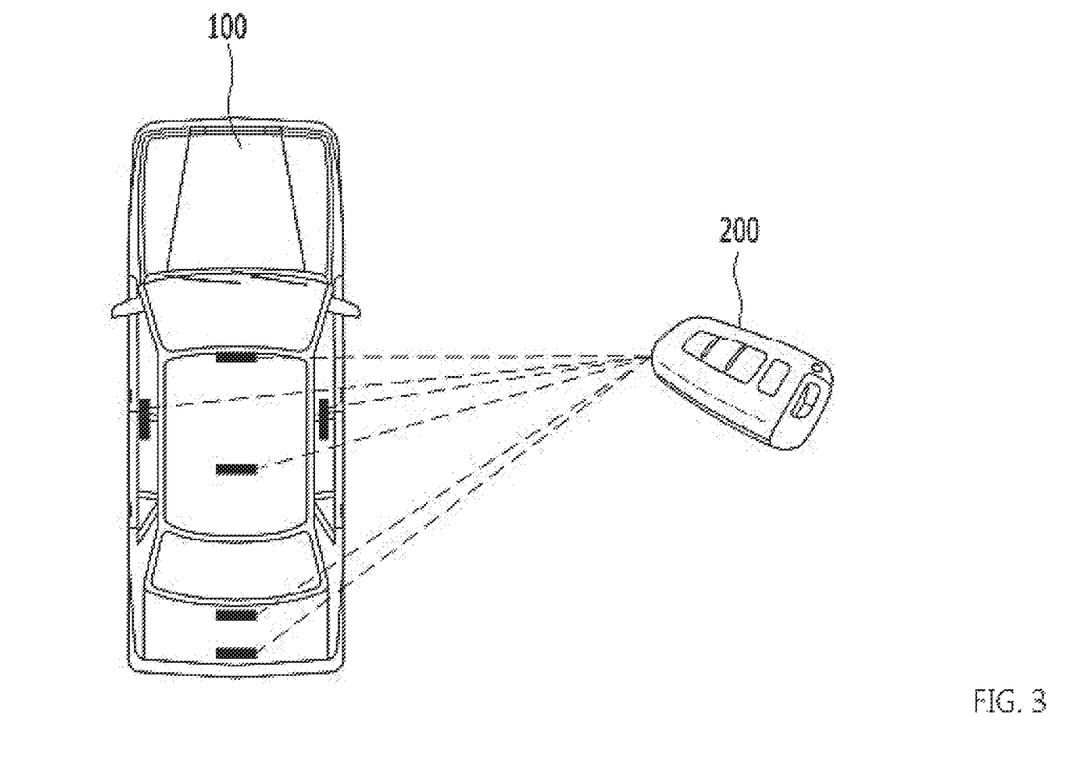

As shown in FIGS. 2a, 2b and 3, when the instruction signal delivered from the remote control device 200 is received by the communication unit 110 so as to command the vehicle 100 to perform a remote control of a driving operation, the vehicle 100 can acquires the current position of the remote control device 200 through the position acquiring unit 120 before performing the remote parking or taking-out. Then, the controller 130 can restrict or limit the remote control when the current position of the remote control device 200 is determined to belong in a predetermined area.

For the way of example but not limitation, as shown in FIG. 2a, when determining that the current position of the remote control device 200 is within the vehicle 100 or very close to the vehicle 100 as the predetermined area, the controller 130 can restrict or limit the remote control of a driving operation of the vehicle 100.

That is, since it is difficult to use the remote control device 200 for promptly stopping the remote parking or driving performed by the vehicle 100, the controller 130 could check a condition before performing the remote parking or taking out and stop the operation when the condition is met, in order to prevent an accident occurred the remote parking or taking-out performed by the vehicle 100.

For the way of example but not limitation, referring to FIG. 2b, when the current position of the remote control device 200 is located far away from the vehicle 100, e.g., the remote control device 200 is not located within a predetermined area (i.e., closer than a predetermined distance from the vehicle 100), the remote parking or taking-out of the vehicle 100 may be restricted. It is because the controller 130 can determine that the instruction signal for remotely controlling a driving operation of the vehicle 100 is unintentionally delivered.

Further, when the remote control device 200 may be erroneously operated by a user at a location far from the vehicle 100, the controller 130 can block the possibility that the vehicle 100 may move.

Hereinafter, referring to FIG. 3, the process that the position acquiring unit 120 acquires the current position of the remote control device 200 will be described in detail.

As shown in FIG. 3, the position acquiring unit 120 gathers RSSI (Received Signal Strength Indicator) data of the instruction signal delivered from the remote control device 200 and received via a low-frequency antenna, and compares the RSSI data with each other to determine the position of the remote control device 200.

First, in order to determine the position of the remote control device 200, an internal correction value K corresponding to the remote control device (e.g., Key fob) 200 is set.

In detail, correction values (K, Kx, Ky, Kz) in response to a spatial dimension, i.e., three axes (e.g., x, y and z-axis), can be measured or determined based at least on receiving sensitivity deviation of three-axis reception coil(s) or antenna(s) in the remote control device 200, resonance frequency deviation of three-axis resonance circuit, and Q-factor deviation. The correction values (K, Kx, Ky, Kz) could be stored in the memory (e.g., EEPROM).

Distances L (L1, L2, L3, . . . ), which corresponds to the position of the remote control device 200, are collected and stored in the vehicle 100.

Herein, the distance L can be calculated by the following Equation 1.

$$L = K \times (K_x * \text{RSSI}_x^2 + K_y * \text{RSSI}_y^2 + K_z * \text{RSSI}_z^2)^{1/6}$$

In Equation 1 above, K, Kx, Ky and Kz are the correction values stored in the memory of the remote control device 200, and RSSIx, RSSIy and RSSIz are RSSI data of low-frequency signal measured by antennas corresponding to each axis, and L is the distance.

The RSSI data received from the remote control device are acquired, and the distances (L1, L2, L3, . . . ) between the antennas of vehicle and the remote control device are calculated. The position acquiring unit 120 can compare the calculated distance with stored distance data to obtain the location of the remote control device 200.

In FIG. 3, plural receivers (black-colored blocks) are equipped in the vehicle 100. In embodiments of the present disclosure, the communication unit 110 can include at least three receivers, which are mounted on different positions in the vehicle 100. Each of receivers can be configured to detect the instruction signal delivered from the remote control signal 200 with RSSI data. According to embodiments of the present disclosure, the position acquiring unit 120 can be configured to calculate candidate locations of the remote control device 200 based at least on RSSI data of the instruction signal, and to determine an intersecting point of the candidate locations as the position of the remote control device 200.

Figure 4:
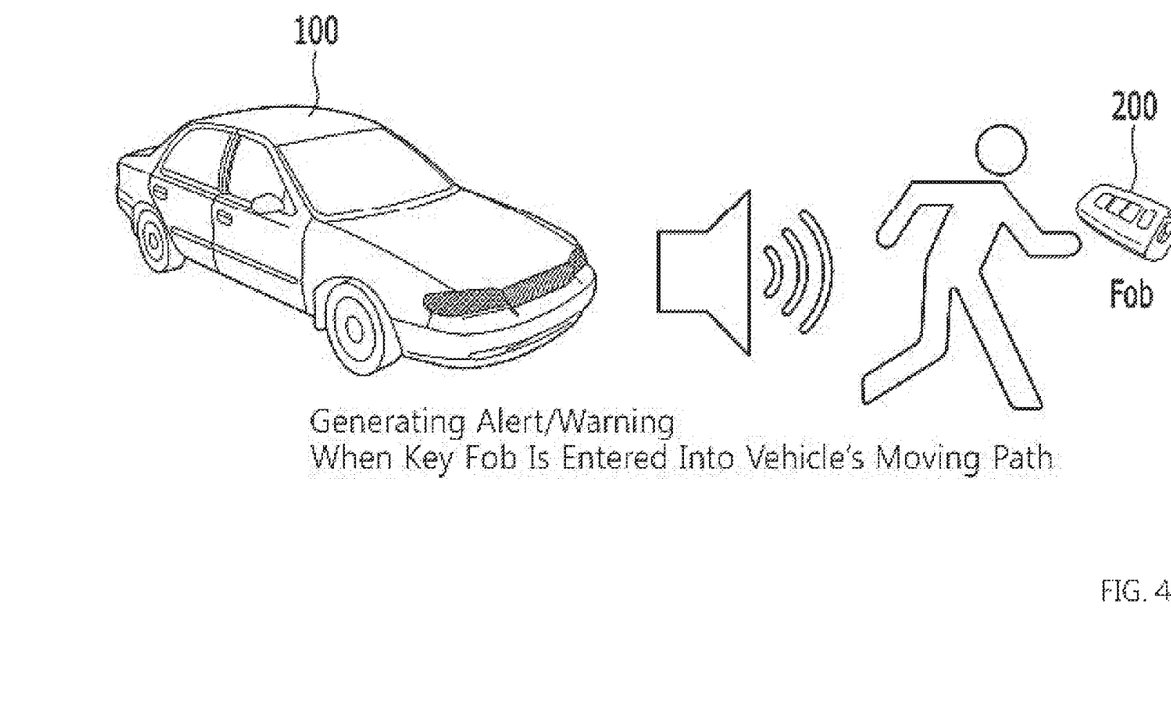
Figure 5:
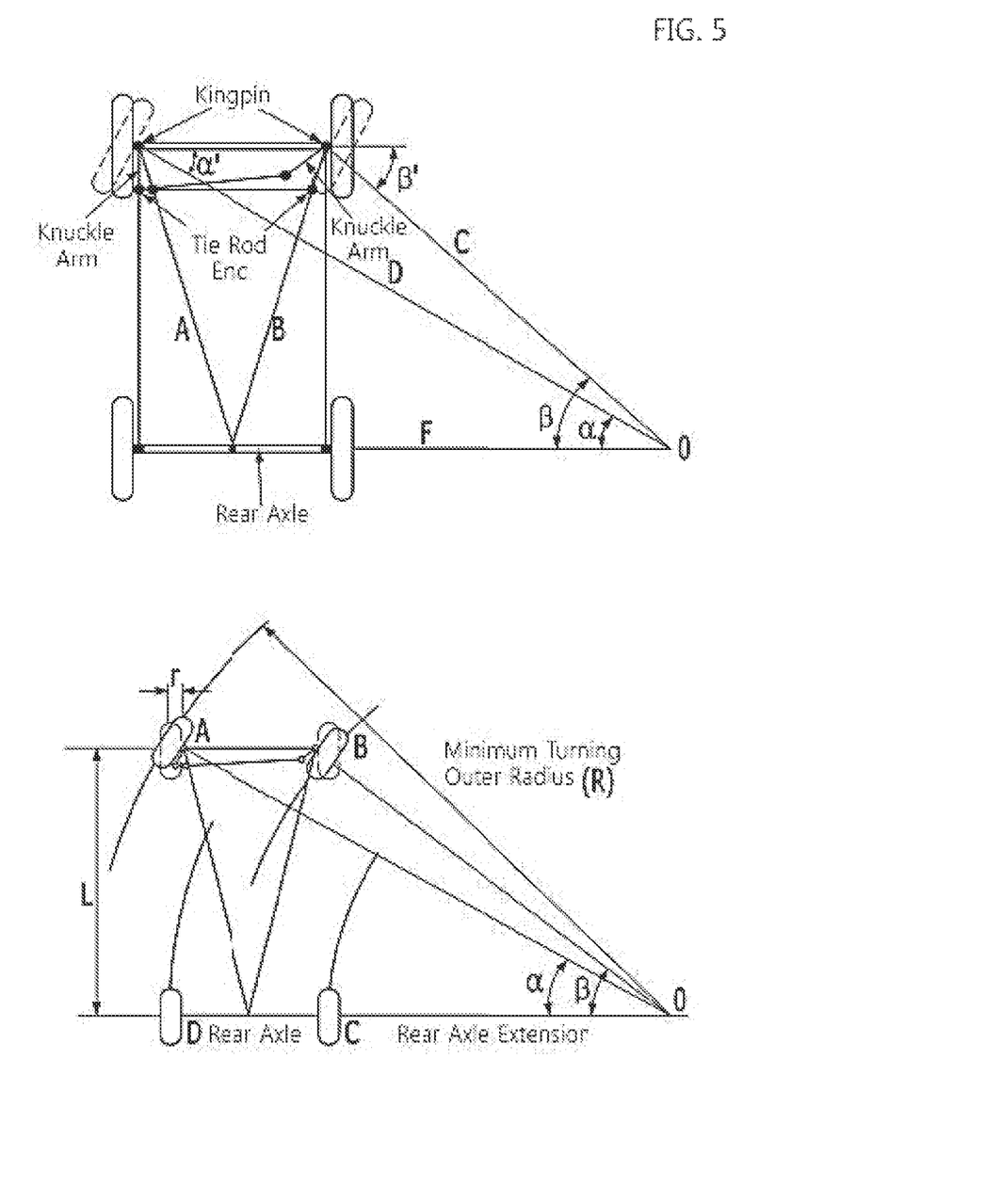

As shown in FIGS. 4 and 5, how to restrict or limit the remote controlling of a driving operation of the vehicle 100 when the remote control device 200 is placed on an estimated path or route for remotely parking or driving the vehicle 100 will be described in detail.

In FIGS. 4 and 5, when recognizing the instruction signal from the remote control device 200 via the communication unit 110 so as to remotely command the vehicle 100 to park at, or take out from, a predetermined area or a parking spot, the controller 130 can understand an estimated path or route before performing the driving operation remote control. The controller 130 can restrict or limit the remote control of the vehicle 100 when the remote control device 200 is placed on the estimated path or route.

That is, when the instruction signal from the remote control device 200 is received via the communication unit 110, the controller 130 instructs the position acquiring unit 120 to determine the position of the remote control device. Herein, the instruction signal is a kind of a radio frequency signal (or a low-frequency signal). According to embodiments of the present disclosure, the controller 130 can perform a low-frequency signal searching via the communication unit 110 to obtain the position of the remote control device 200.

Then, when the controller 130 may calculate the estimated path or route of the vehicle 100 before starting the remote control of the driving operation. When it is determined that the remote control device 200 is located on the calculated path or route, the controller 130 can prohibit the remote control of the vehicle 100.

At this time, the controller 130 may perform an operation for informing or notifying a user having the remote control apparatus 200 that the remote control of the driving operation of the vehicle 100 is restricted because the remote control device 200 is placed on the estimated path or route.

According to embodiments of the present disclosure, when the remote control device 200 is placed on the estimated path or route, the controller 130 can output a sound indicating that the remote parking or taking-out is restricted through a speaker mounted on the vehicle 100. Or, to notify that the operation for remotely controlling a driving operation of the vehicle 100 is restricted, the controller 130 can generate a horn (e.g., the Klaxon horn) of the vehicle 100 a predetermined number of times during a predetermined period. The controller 130 can turn on an emergency light of the vehicle 100 for a predetermined time to inform that the remote control is restricted. Further, a headlight of the vehicle 100 may be turned on by the controller 130 for a predetermined time to inform that the operation for remotely controlling a driving operation of the vehicle 100 is restricted. It is possible to notify that remote control is restricted by turning on a high beam of the headlight of the vehicle 100 a predetermined number of times for a predetermined time.

Referring to FIG. 5, embodiments of the present disclosure can use Ackerman-Jantoud steering structure to estimate a path or route for remotely controlling a driving operation of the vehicle 100.

The vehicle 100 can include the Ackerman-Jantoud type of front wheel steering system. When the vehicle 100 is parked at a predetermined area (e.g., parking spot) or taken out from the predetermined area, the vehicle 100 moves at a very low speed. During parking or driving, centrifugal force of curved path or route is marginal so that the minimum turning outer radius R shown in FIG. 5 might be not go awry.

In the Ackerman-Jantoud type, a front outer wheel and a front inner wheel have different rotation angles so that the two front wheels have the same theoretic rotation center. A rotation radius of the front outer wheel may be determined based on its rotation angle α. For example, the rotation radius is calculated as follows: (wheel space/base)/sin α+(distance between a kingpin and a wheel ground plane).

In order to check the estimated path or route of the vehicle, a steering angle is monitored by a steering column steering angle sensor in real time, and the rotation angle α is derived using the steering angle of the steering column and the angle mapping data of the front outer wheel.

Then, the rotation radius of vehicle outer surface is calculated as (wheel space/base)/sin α+(distance between a kingpin and a wheel ground plane)+(correction value based on a shape of the vehicle). The rotation radius of vehicle inner surface is calculated as cos α×[(rotation radius of front outer wheel)+(distance between a kingpin and a wheel ground plane)]−(vehicle width).

Then, the estimated path or route of the vehicle can be determined and schematized based on the rotation radii of vehicle outer surface and vehicle inner surface. The controller 130 can compare the location of the remote control device 200 with schematized path or route. When the remote control device 200 is placed on the schematized path, it can be determined that the remote control device 200 is on the estimated path or route for remotely controlling a driving operation of the vehicle 100.

Figure 6:
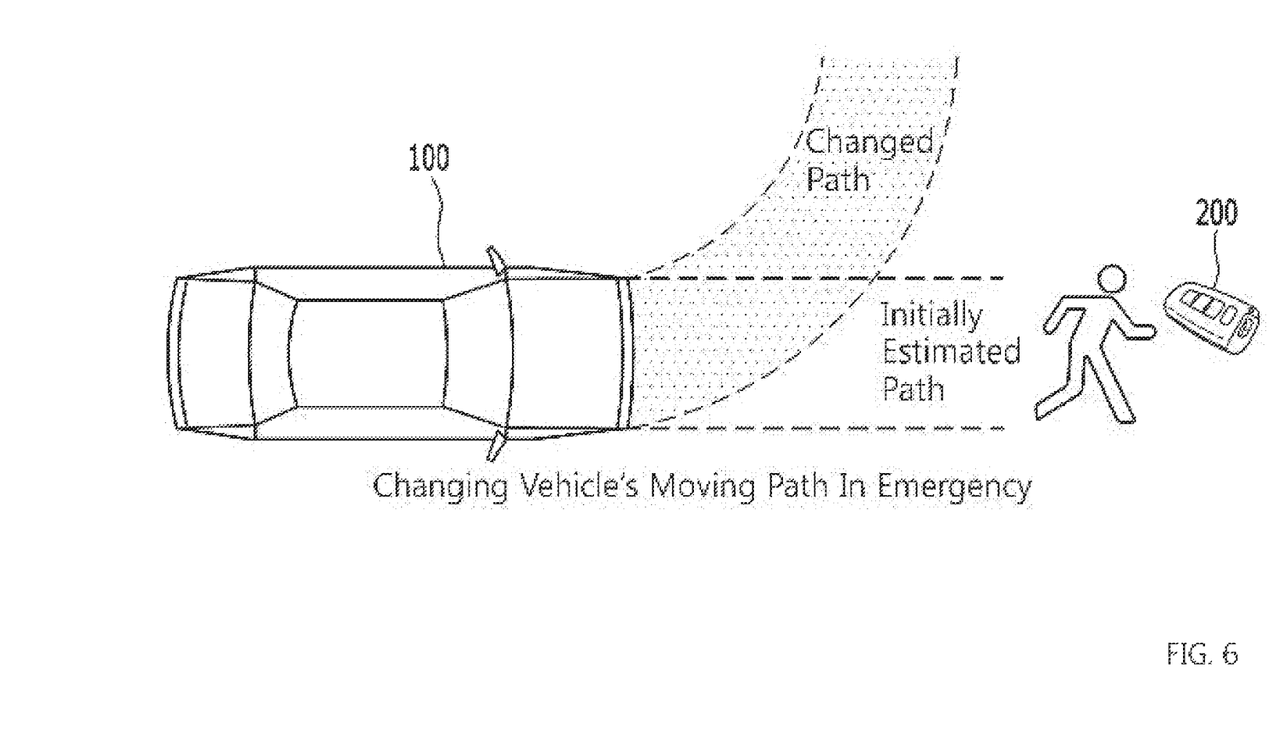
Figure 7A:
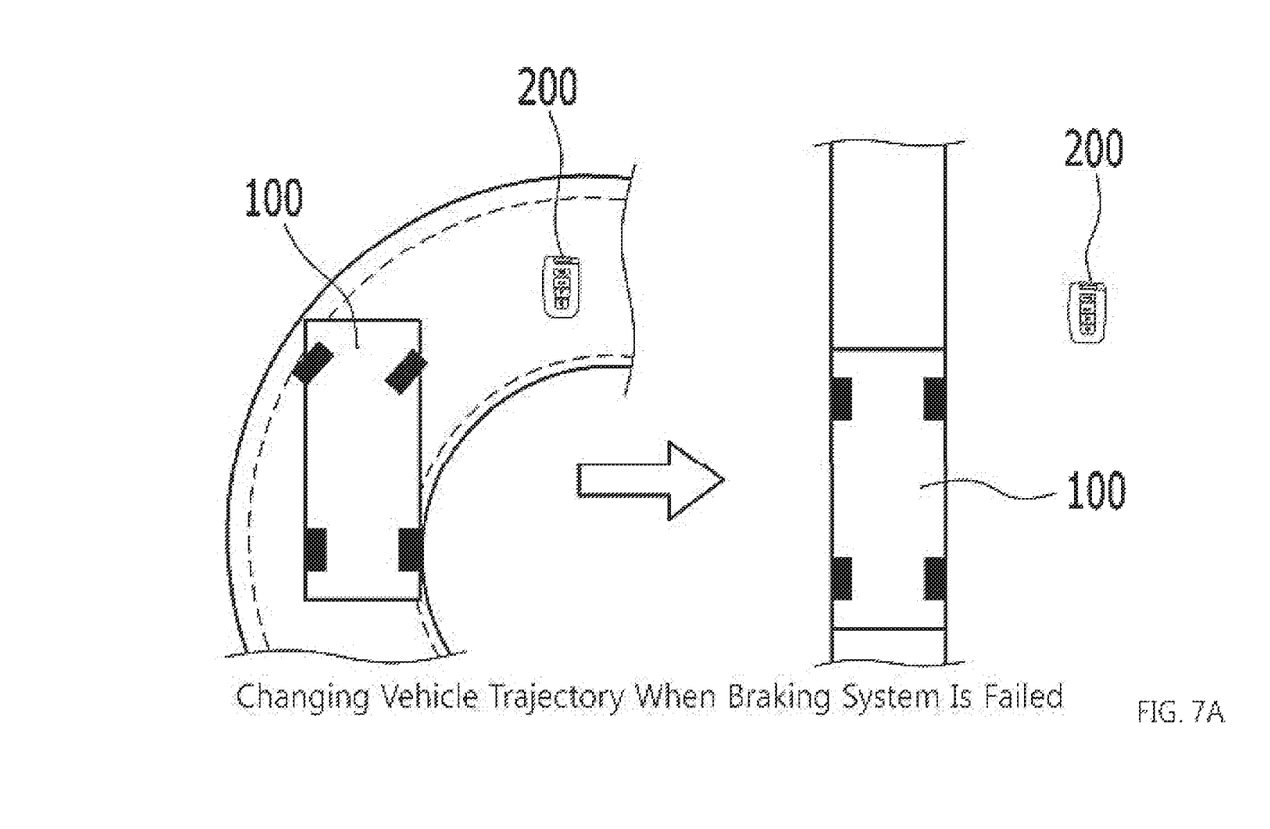
Figure 7B:
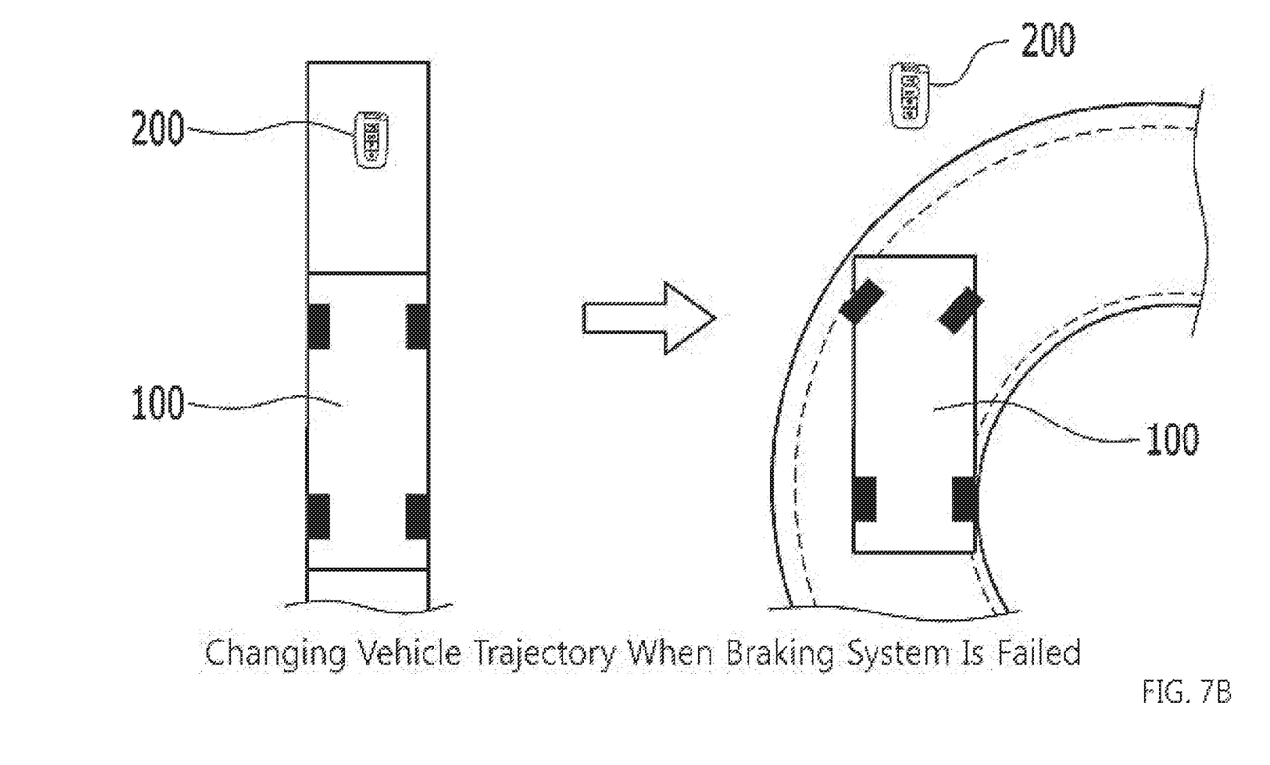

With reference to FIGS. 6 and 7b, a process for changing the estimated path or route when the remote control device 200 is on the estimated path or route while the vehicle 100 is remotely parked at or driven from a predetermined area is described in detail.

As shown in FIGS. 6 and 7b, when the vehicle 100 moves in response to the instruction signal so as to remotely be parked or taken out, the controller 130 can recognize the estimated path or route determined by the process shown in FIG. 5, and perform an operation for notifying or alerting collision to a user if the remote control device 200 is determined to be placed on the estimated path or route.

By the way of example but not limitation, when the remote control device 200 is placed on the estimated path or route, the controller 130 can output a warning sound to avoid collision between the vehicle 100 and a user having the remote control device 200. Or, to alert the collision with the vehicle 100 to the user having the remote control device 200, the controller 130 can generate a horn (e.g., the Klaxon horn) of the vehicle 100 a predetermined number of times during a predetermined period. The controller 130 can turn on an emergency light of the vehicle 100 for a predetermined time to inform that there is a possibility to collide the vehicle 100 and the user having the remote control device 200. Further, a headlight of the vehicle 100 may be turned on by the controller 130 for a predetermined time to warn the user from collision with the vehicle 100. It is possible to warn the user from collision with the vehicle 100 by turning on a high beam of the headlight of the vehicle 100 a predetermined number of times for a predetermined time.

Then, when the vehicle 100 moves in response to the instruction signal so as to remotely be parked or driven, the estimated path or route is calculated through the process shown in FIG. 5. When the remote control device 200 is placed on the estimated path or route, the controller 130 can control a motor driven power steering (MDPS) system to make the remote control device 200 get out of the estimated path or route in order to change the estimated path or route to prevent the collision between the vehicle 100 and the user possessing the remote control device 200.

For example, FIG. 6 shows that the vehicle 100 can change an initially estimated path or route for remote control with another path or route which the remote control device 200 is not placed on.

Further, as shown in FIGS. 7a and 7b, while the vehicle 100 is remotely parked at, or taken out from, a parking spot, the controller 130 monitors whether the braking system of the vehicle 100 is failed. When the braking system is failed, the controller 130 determines the estimated path or route for remotely parking or driven the vehicle 100, which can be determined by a process shown in FIG. 5. When the remote control device 200 is located on the estimated path or route, the controller 130 can control the motor driven power steering (MDPS) system of the vehicle 100 to make the remote control device 200 get out of the estimated path or route in order to change the estimated path or route.

For the way of example but not limitation, as shown in FIG. 7a, when the remote control device 200 is on the estimated path while the vehicle 100 turns to the right, the vehicle stops turning to the right and moves straight. Referring to FIG. 7b, when the remote control device 200 is on the estimated path while the vehicle moves straight, the vehicle 100 stops moving straight and turns to the right to avoid collision with the remote control device 200.

The aforementioned embodiments are achieved by disclosure in a predetermined manner. Each of the structural combination of structural elements and features of the elements or features can be considered selectively unless specified separately. Each of the structural elements or features may be carried out without being combined with other structural elements or features. Also, some structural elements and/or features may be combined with one another to constitute the embodiments of the disclosure. The order of operations described in the embodiments of the disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof.

It will be apparent to those skilled in the art that various modifications and variations can be made in the present disclosure without departing from the spirit or scope of the disclosures. Thus, it is intended that the disclosure covers the modifications and variations of this disclosure provided they come within the scope of the appended claims and their equivalents.

What is claimed is:

1. A vehicle, comprising:
   a communication unit performing communication with a remote control device and receiving an instruction signal for remotely controlling a driving operation of the vehicle from the remote control device;
   a position acquiring unit detecting a position of the remote control device when the communication unit receives the instruction signal from the remote control device; and
   a controller restricting the remote control of the driving operation of the vehicle based on the detected position of the remote control device,
   wherein the controller estimates a moving path for the driving operation of the vehicle, and restricts the remote control of the driving operation of the vehicle when the remote control device is determined to be located along the moving path.

2. The vehicle according to claim 1, wherein the controller generates and sends a notification to the remote control device informing that the remote control of the driving operation of the vehicle is restricted.

3. The vehicle according to claim 1, wherein the controller determines whether the remote control device is located in the vehicle based on the detected position of the remote control device, and restricts the remote control of the driving operation of the vehicle when the remote control device is determined to be located in the vehicle.

4. The vehicle according to claim 1, wherein the controller determines whether the remote control device is located within a predetermined distance of the vehicle based on the detected position of the remote control device, and restricts the remote control of the driving operation of the vehicle when the remote control device is determined to be located within the predetermined distance from the vehicle.

5. The vehicle according to claim 1, wherein the moving path includes at least one of a straight line and a curve in a forward or backward direction.

6. The vehicle according to claim 1, wherein the controller determines whether the remote control device is located along the estimated moving path based on the detected position of the remote control device.

7. The vehicle according to claim 5, wherein the controller generates and sends a collision warning, alert, or notification to the remote control device when the remote control device is determined to be located along the moving path.

8. The vehicle according to claim 5, wherein the controller changes the moving path when the remote control device is determined to be located along the moving path so that the moving path deviates from the remote control device.

9. The vehicle according to claim 1, wherein the communication unit includes at least three receivers, each receiver detecting the instruction signal from the remote control device, the at least three receiver being mounted at different positions in the vehicle.

10. The vehicle according to claim 9, wherein the position acquiring unit calculates candidate locations of the remote control device based on signal powers of received instruction signals, each of the instruction signals being detected by each of the at least three receivers, and determines an intersecting point of the candidate locations to be the position of the remote control device.

11. The vehicle according to claim 1, wherein the controller monitors a braking system of the vehicle, and adjusts a moving path of the vehicle according to the remote control of the driving operation of the vehicle when the controller detects a predetermined error in the braking system.

12. A method for controlling a vehicle, comprising:
    receiving, by a communication unit, an instruction signal for remotely controlling a driving operation of the vehicle from a remote control device;
    detecting, by a position acquiring unit, a position of the remote control device when the communication unit receives the instruction signal from the remote control device;
    estimating, by a controller, a moving path for the driving operation of the vehicle; and
    restricting, by the controller, the remote control of the driving operation of the vehicle based on the detected position of the remote control device,
    wherein the remote control of the driving operation of the vehicle is restricted when the remote control device is determined to be located along the moving path.

13. The method of claim 12, further comprising:
    generating and sending, by the controller, a notification to the remote control device informing that the remote control of the driving operation of the vehicle is restricted.

14. The method of claim 12, wherein the restricting of the remote control comprises:
    determining, by the controller, whether the remote control device is located in the vehicle based on the detected position of the remote control device; and
    restrict, by the controller, the remote control of the driving operation of the vehicle when the remote control device is determined to be located in the vehicle.

15. The method of claim 12, wherein the restricting of the remote control comprises:
    determining, by the controller, whether the remote control device is located within a predetermined distance of the vehicle based on the detected position of the remote control device; and
    restricting, by the controller, the remote control of the driving operation of the vehicle when the remote control device is determined to be located within the predetermined distance from the vehicle.

16. The method of claim 12, wherein:
    moving path includes at least one of a straight line and a curve in a forward or backward direction.

17. The method of claim 12, wherein the restricting of the remote control comprises:
    determining, by the controller, whether the remote control device is located along the estimated moving path based on the detected position of the remote control device.

18. The method of claim 16, further comprising:
    generating and sending, by the controller, a collision warning, alert, or notification to the remote control device when the remote control device is determined to be located along the moving path.

19. The method of claim 16, further comprising:
    changing, by the controller, the moving path when the remote control device is determined to be located along the moving path so that the moving path deviates from the remote control device.

20. An apparatus for controlling a vehicle, equipped within the vehicle, comprising a processing system having at least one data processor and at least one memory storing a computer program, wherein the processing system is configured to cause the apparatus to:
    receive an instruction signal for remotely controlling a driving operation of the vehicle from a remote control device;
    detect a position of the remote control device in response to receiving the instruction signal from the vehicle;
    estimate a moving path for the driving operation of the vehicle; and
    restrict the remote control of the driving operation of the vehicle based on the detected position of the remote control device,
    wherein the remote control of the driving operation of the vehicle is restricted when the remote control device is determined to be located along the moving path.

* * * * *